D. WETZEL.
Tire Bending.
No. 71,100. Patented Nov. 19, 1867.
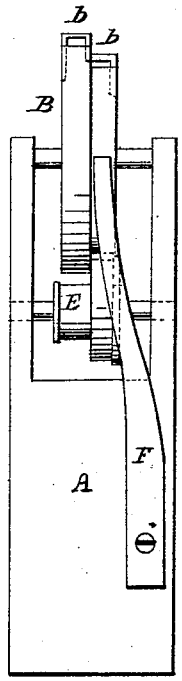
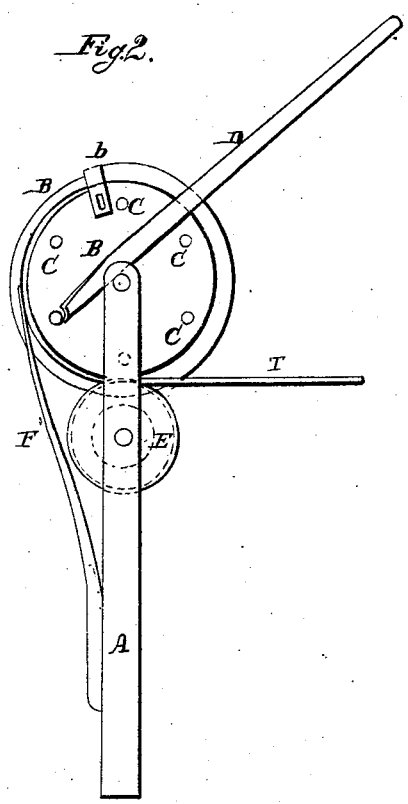
Witnesses:
Inventor

United States Patent Office.

DENNIS WETZEL, OF SPRINGFIELD, MISSOURI.

Letters Patent No. 71,100, dated November 19, 1867.

IMPROVED MACHINE FOR BENDING TIRES.

*The Schedule referred to in these Letters Patent and making part of the same.*

TO ALL WHOM IT MAY CONCERN:

Be it known that I, DENNIS WETZEL, of Springfield, in the county of Greene, and State of Missouri, have invented a new and improved Device for Bending Tires; and I do hereby declare that the following is a full, clear, and exact description thereof, which will enable those skilled in the art to make and use the same, reference being had to the accompanying drawings, forming part of this specification.

This invention relates to an improved device for bending tires for wheels. It consists of a double-rimmed wheel to suit tires of different sizes. In each rim or periphery is an iron loop or bridle, in which the end of the tire is inserted. On one face of the wheel is a number of pins to serve as rests for a hand-lever by which the wheel is to be revolved. Beneath the double-rimmed wheel is a double-rimmed roller, between which and the adjacent rim of the wheel the tire is to be drawn. A spring keeps the bending-wheel in place while the lever is being shifted. In the accompanying drawings—

Figure 1 is a front, and

Figure 2 a side view of my improved tire bending-device.

Similar letters of reference indicate corresponding parts.

A is the frame, within which the parts of my device are disposed. B is a double-rimmed wheel journalled in the frame A, and provided with the bridles $b\ b$ in the peripheries of the rims to receive the tire to be bent. C C C are pins, serving as rests for the end of the hand-lever D, by which the wheel B is to be revolved. Beneath the wheel B is the double-rimmed roller E, also journalled in the frame A, so disposed that the larger rim of the roller is opposite to the smaller rim of the bending-wheel, and the smaller rim of the roller to the larger rim of the bending-wheel. The spring F holds the bending-wheel in place when the lever D has to be shifted, and is movable sideways to enable the tire T to be removed.

Tire-benders have been constructed of a single-rimmed wheel and roller, the wheel being revolved by a hand-lever; nor do I claim the same, but, having thus described my invention.

What I claim as new, and desire to secure by Letters Patent, is—

1. The double-rimmed wheel B and double-rimmed roller E, disposed in frame A, substantially as above set forth and described.

2. The wheel B and roller E, in combination with the spring F, arranged and operating as and for the purposes substantially as above set forth and described.

DENNIS WETZEL.

Witnesses:
   W. A. KNOTT,
   I. P. SHIPMAN.